US012593952B2

(12) United States Patent
Disch et al.

(10) Patent No.: US 12,593,952 B2
(45) Date of Patent: Apr. 7, 2026

(54) CONVEYOR FOR A DISHWASHER AS WELL AS DISHWASHER HAVING SUCH A CONVEYOR

(71) Applicant: ILLINOIS TOOL WORKS INC., Glenview, IL (US)

(72) Inventors: Harald Disch, Elzach (DE); Martin Schrempp, Biberach (DE); Benjamin Franz, Hohberg (DE); Björn Brodowski, Hohberg (DE); Adrian Boldt, Offenburg-Buhl (DE); Norbert Litterst, Offenburg (DE); Harry Braun, Durbach (DE); Frank Zoller, Offenburg-Elgersweier (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 290 days.

(21) Appl. No.: 18/318,281

(22) Filed: May 16, 2023

(65) Prior Publication Data

US 2023/0371777 A1 Nov. 23, 2023

(30) Foreign Application Priority Data

May 18, 2022 (DE) ..................... 10 2022 112 518.1

(51) Int. Cl.
A47L 15/00 (2006.01)
A47L 15/46 (2006.01)
B65G 17/36 (2006.01)

(52) U.S. Cl.
CPC .......... *A47L 15/0071* (2013.01); *A47L 15/46* (2013.01); *B65G 17/36* (2013.01); *A47L 2501/24* (2013.01)

(58) Field of Classification Search
None
See application file for complete search history.

(56) References Cited

U.S. PATENT DOCUMENTS

2019/0282060 A1* 9/2019 Neumaier ........... A47L 15/4295

FOREIGN PATENT DOCUMENTS

| CN | 109247888 A | 1/2019 |
| EP | 0600125 A1 | 6/1994 |
| EP | 3597316 A1 | 1/2020 |
| GB | 2575313 A | 1/2020 |
| KR | 20040087763 A | 10/2004 |

* cited by examiner

*Primary Examiner* — Rita P Adhlakha
(74) *Attorney, Agent, or Firm* — THOMPSON HINE LLP

(57) ABSTRACT

A conveyor for transporting dishes, in particular drinking containers, through at least one treatment zone of a dishwasher and/or for feeding dishes to the dishwasher. The conveyor includes a circulating conveyor system, a plurality of retaining elements connected to the circulating conveyor system and configured in order to releasably receive and/or releasably retain drinking containers, in particular in a positively locking manner and preferably at least in a sectionally or partially positively locking manner, and a support system for at least partially and/or sectionally supporting the drinking containers, received by the retaining elements.

16 Claims, 11 Drawing Sheets

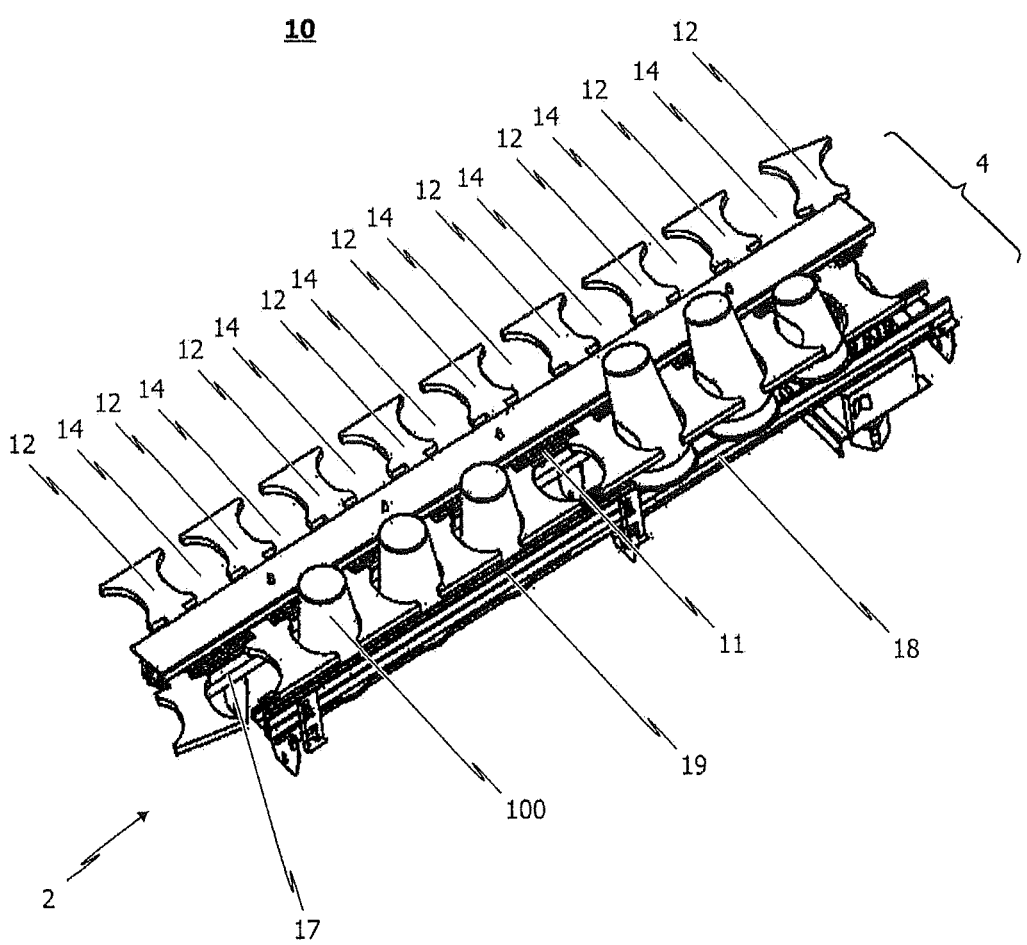
_FIG. 3_

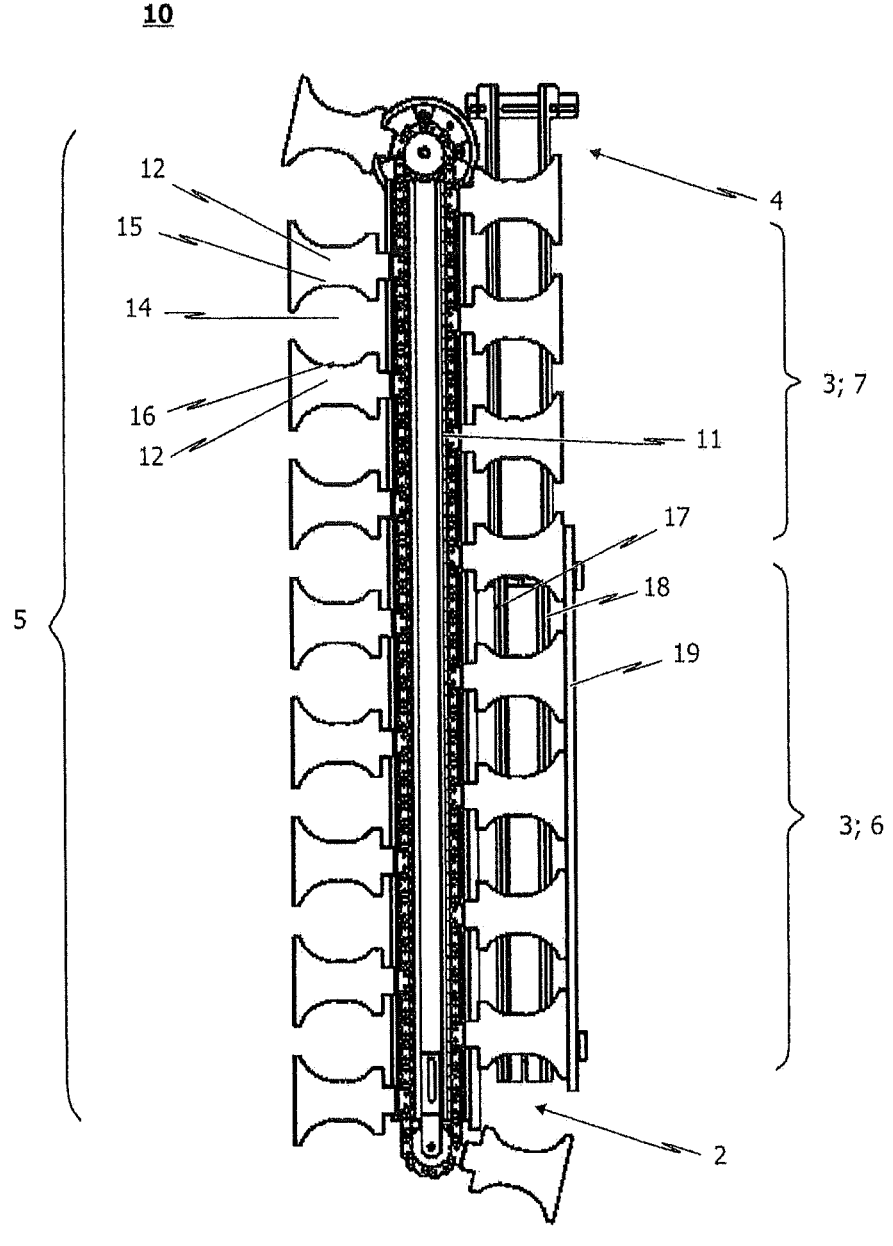
_FIG. 8_

CONVEYOR FOR A DISHWASHER AS WELL AS DISHWASHER HAVING SUCH A CONVEYOR

TECHNICAL FIELD

The invention relates generally to the field of industrial washing. Specifically, the invention relates to a special dishwasher that is in particular optimized for use in a coffee shop and/or a fast-food restaurant for cleaning dishes. Furthermore, the invention relates to a conveyor for such a dishwasher that is specifically designed for use in a coffee shop and/or in a fast-food restaurant.

BACKGROUND

The dishwasher according to the invention is designed as a conveyor dishwasher and comprises a conveyor for transporting dishes from an input or insertion section associated with the dishwasher to a treatment section of the dishwasher and from there to an output or removal section of the dishwasher. The input or insertion section associated with the dishwasher represents the dirty zone, while the output or removal section of the dishwasher represents the clean zone of the machine.

By contrast to the batch processes of stationary programmed machines, such as domestic dishwashers or undercounter dishwashers, continuous operation is possible because conveyor dishwashers transport the dishes through different treatment zones (in particular wash zones and rinse zones) of the machine. The disadvantage of conveyor dishwashers, however, is the relatively large footprint requirement in the installation space.

Nevertheless, there is an increasing need to utilize the advantages of a conveyor dishwasher in applications that only provide limited installation floorspace.

Nowadays hot beverage vending machines, in particular coffee machines, of various models and sizes are almost always available for self-service in hotels, company cafeterias, public buildings, hospitals, schools, and highway rest areas. These hot beverage vending machines are typically adapted to fill drinking containers (beverage cups) with a selected hot beverage; however, plastic cups are also used by vending machines installed in businesses or public buildings.

This applies likewise in coffee shops or fast-food restaurants, where it is common practice to serve a coffee specialty selected by the customer to the customer in a so-called coffee-to-go cup. Given the enormous amount of plastic waste generated every day by disposable tableware, there is an effort to reduce the amount of disposable tableware used, in particular in coffee shops or fast-food restaurants.

One approach to reducing the ecological footprint of coffee shops or fast-food restaurants is to use disposable tableware, such as disposable coffee-to-go cups, that are recyclable. In this context, disposable tableware made of cellulose acetate or so-called oxo-biodegradable plastics, for example, are known.

The problem with such disposable tableware, however, is that the oxo-biodegradable plastics can degrade only under specific defined conditions, whereby these specific conditions are generally not in place for recycling. As a result, the material of the disposable tableware breaks down into microplastics and can continue to burden health and the environment.

Moreover, the production of disposable tableware made of oxo-biodegradable plastic is relatively complex and therefore likewise has a negative impact on the ecological footprint.

Given this situation, the problem addressed by the invention is therefore based on providing a solution, in particular for coffee shops or fast-food restaurants, that can significantly reduce their ecological footprint.

Conventional conveyor dishwashers designed for in particular large washrooms are—if ever—only partially suited for the planned use in a coffee shop or a fast-food restaurant. This is due on the one hand to the fact that conveyor dishwashers designed for large washrooms require a relatively large space to be placed, which is usually not available in a coffee shop or in a fast-food restaurant, especially if the dishwasher is to be loadable by the customers of the coffee shop or the fast-food restaurant.

Apart from this, conventional dishwashers designed for washrooms use conveyors that are also not really suitable for use in a coffee shop or a fast-food restaurant. In conventional conveyor dishwashers designed for washrooms, a relatively wide conveyor belt is generally used as a conveyor, on which the cleaning staff place the dishes to be cleaned in the corresponding compartments. The cleaning staff usually pay attention to the correct orientation and safe positioning of the dishes to be cleaned.

However, this cannot be expected of customers of a coffee shop or fast-food restaurant. There is thus also a need for an optimized conveyor in which the dishes to be cleaned are receivable in a self-explanatory manner, while ensuring a secure fixation of the stored dishes to be cleaned on the one hand and a correct and optimal alignment of the dishes to be cleaned on the other hand.

SUMMARY

Accordingly, the invention relates to a conveyor for a dishwasher, in particular for a dishwasher of a coffee shop and/or a fast-food restaurant, for transporting dishes to be cleaned, in particular drinking containers, through at least one treatment zone of the dishwasher and/or for feeding dishes to be cleaned, in particular drinking containers, to the dishwasher. The conveyor according to the invention comprises a circulating conveyor system, which is in particular embodied in the form of a circulating transport chain or in the form of an circulating conveyor belt.

According to the invention, it is provided in particular that the conveyor comprises a plurality of retaining elements connected to the circulating conveyor system and configured in order to releasably receive and/or releasably retain dishes to be washed, in particular drinking containers, in particular in a positively locking manner and preferably at least in a regionally or partially positively locking manner. Further, the conveyor comprises a support system, which serves to support at least partially and/or sectionally the dishes received by the retaining elements of the conveyor, in particular drinking containers.

By contrast to conventional conveyor belts used in dishwashers for washrooms, the conveyor according to the invention has significant advantages that allow the conveyor to be suitable in particular for dishwashers of a coffee shop and/or a fast-food restaurant.

By providing a plurality of retaining elements, each of which is configured so to releasably receive and releasably hold the dishes to be cleaned in particular in a positively locking manner and preferably at least in a regionally or partially positively locking manner, the conveyor can also optimally be equipped with dishes to be cleaned by persons not belonging to the cleaning staff. The retaining elements, which serve to receive the dishes to be cleaned in particular in a positively locking manner, allow an intuitive occupancy of the conveyor with dishes, i.e., a way in which the conveyor is to be loaded with dishes, which is also self-explanatory for untrained personnel. In this context, for example, it is conceivable that the retaining elements are designed to only allow the receipt of a particular dish type, such as drinking containers. Alternatively and additionally, it is conceivable that the retaining elements also intuitively provide the user with the orientation of the dishes belonging to the dish type.

It is thus ensured that, with the aid of the retaining elements, the dishes to be cleaned, in particular the drinking containers, are placed in the specified position and in particular also with the specified orientation, which guarantees an optimal washing/rinsing result.

On the other hand, the retaining elements are configured so that the stored dishes to be cleaned, in particular drinking containers, are retained releasably by the retaining elements. This ensures that the positioning and orientation of the dishes is not changed when they are transported to or by the dishwasher.

This is further supported by the fact that the conveyor according to the invention comprises a support system in addition to the retaining elements in order to support the dishes received by the retaining elements, in particular drinking containers, in their state having been received by the retaining elements.

According to a preferred realization of the conveyor according to the invention, it is provided that the retaining elements are preferably respectively configured as pusher dogs that radially protrude from the conveyor system with respect to the conveying direction of the circulating conveyor system and are at least partially or sectionally horizontally transported or transportable with the circulating conveyor system.

Each pusher dog preferably comprises a corresponding receiving section in which a dish, in particular a drinking container, is at least partially or sectionally receivable. In this context, it can be appreciated that the receiving section of each pusher dog is in particular pocket-shaped and preferably star pocket-shaped. The pocket-shaped and preferably in particular the star pocket-shaped receiving section can be at least partially or sectionally adapted to the outer contour of the dish to be cleaned.

This further allows the retaining elements to be loaded with dishes, in particular a predefined or definable dish type according to the Poka-Yoke principle. For example, the retaining elements are designed so that dishes of the predefined or definable dish type can only be received in a predefined alignment and/or orientation.

According to implementations of the lastly mentioned embodiment, the particularly pocket-shaped and preferably star pocket-shaped receiving section is preferably formed by at least one circular segment-shaped portion of the pusher dog.

Alternatively or in addition to the aforementioned embodiment of the retaining elements, however, it is also possible that the retaining elements are preferably respectively configured as pusher dogs that radially protrude from the conveyor system with respect to the conveying direction of the circulating conveyor system and are at least partially or sectionally horizontally transported with the circulating conveyor system, wherein, between two adjacent pusher dogs, the receiving section is or can be formed for partially or sectionally receiving the dish to be cleaned, in particular the drinking container to be cleaned.

Again, the receiving section, which is formed between two adjacent pusher dogs, is preferably pocket-shaped and more preferably star pocket-shaped.

According to implementations of this embodiment, it is conceivable that the particularly pocket-shaped and preferably star pocket-shaped receiving section between two adjacent pusher dogs is preferably formed by a first circular segment-shaped portion of a first pusher dog of the two adjacent pusher dogs and by a second circular segment-shaped portion of a second pusher dog of the two adjacent pusher dogs.

Regardless of whether the retaining elements are designed individually, according to further developments of the lastly mentioned embodiments, it is provided that the particularly pocket-shaped and preferably star pocket-shaped receiving section—at least partially or sectionally—is designed in order to be flexible in such a way that, in the particularly pocket-shaped and preferably star pocket-shaped receiving section, dishes and in particular drinking containers of different sizes and in particular of different diameters and/or dishes and in particular drinking containers having a different outer geometry are at least partially or sectionally receivable.

The flexible design of the receiving section of the retaining elements thus allows the conveyor to be suitable for different dishes, in particular of the same dish type, such as for differently sized drinking containers. At the same time, the flexible design of the receiving section ensures that the dishes received by the retaining elements are transportable securely to the dishwasher, in particular through the dishwasher, without altering the alignment and/or orientation of the dishes chosen for the loading section of the dishwasher.

The flexible design of the receiving section can be realized in a variety of ways. For example, it is conceivable that the receiving section is formed at least partially or sectionally from an elastically flexible material.

On the other hand, it is alternatively or additionally conceivable for the receiving section to be formed from two in particular circular segment-shaped portions that are movable relative to one another, at least over a certain travel path, wherein, with the aid of a biasing element, for example a spring, the two in particular circular segment-shaped portions should be biased towards a position facing one another.

Alternatively or in addition to the aforementioned embodiments of the retaining elements, according to one aspect of the invention, it is provided that the retaining elements are preferably respectively configured as receiving fingers or receiving pins that project radially from the conveyor system with respect to the conveying direction of the circulating conveyor system and are at least partially or sectionally vertically transported with the circulating conveyor system. Each receiving finger or receiving pin is configured in particular in order to at least partially or sectionally receive an upside-down oriented drinking container.

The provision of such receiving fingers or receiving pins ensures in an easily implemented but nevertheless effective manner that, for example, a drinking container can only be connected to the retaining elements of the conveyor in the correct orientation, i.e., in the upside-down aligned state.

As already stated, the conveyor according to the invention is also characterized by the support system in addition to the retaining elements, which serves to support the dishes received at least partially and/or sectionally, in particular the drinking containers. This, in combination with the retaining elements, ensures that the positioning and relative orientation of the dishes is not changed even when treating the dishes in at least one treatment zone of the dishwasher.

According to configurations of the conveyor according to the invention, it is provided with respect to the support system that it comprises at least one guide extending at least sectionally parallel to the conveyor system and/or at least one guide running at least sectionally parallel to the conveyor system and in particular running concurrently with the conveyor system.

By providing such a guide, which is either statically arranged or runs concurrently with the conveyor system, it is possible in an easily implemented but nevertheless effective manner that the dishes received by the retaining elements of the conveyor, in particular the drinking containers, can be transported to the dishwasher or through the dishwasher according to a specified sequence of events.

In this context, it is in particular conceivable that the at least one guide runs below the retaining elements and serves in particular to vertically support the dishes, in particular drinking containers, received or retained by the retaining elements.

It is preferably provided in this context that the at least one guide comprises at least one guide rail extending at least sectionally parallel to the conveyor system or at least one guide belt extending at least sectionally parallel to the conveyor system. Alternatively or additionally, it is conceivable that the at least one guide comprises at least one guide rail running at least sectionally parallel to the conveyor system and in particular running concurrently with the conveyor system or at least one guide belt running at least sectionally parallel to the conveyor system and in particular running concurrently with the conveyor system.

By using a guide rail or a guide belt as a guide, it is still possible to spray the dishes from below with washing or rinsing fluid without the guide throwing at least significant spray shadows on the dishes to be treated.

According to preferred implementations of the conveyor according to the invention, it is provided that the retaining elements are configured such that drinking containers to be cleaned are receivable upside-down. In a state having been received by the retaining elements, the drinking containers are pivotally mounted about an axis extending parallel to the conveyor system relative to the conveyor system and/or relative to the retaining elements, at least over a certain angular range of preferably up to max. 25°.

Such a pivotable placement of the drinking containers in their state having been received by the retaining elements allows the drinking containers to be tilted slightly during transport, in particular through the dishwasher, in particular with the aid of the guide, compared to the originally upside-down horizontal orientation. This provides significant benefits because, in the tilted state, the washing and/or rinsing liquid sprayed onto the dishes can drain more easily.

For example, it is conceivable that the at least one guide rail or the at least one guide belt is configured such that, when transporting the drinking containers received by the retaining elements in a predefined or definable section or portion of the dishwasher, the drinking containers received by the retaining elements are pivoted about the axis running parallel to the conveyor system.

In a specific realization of the lastly mentioned embodiment, which is characterized in particular by its simple yet effective construction, it is provided that the at least one guide comprises a first guide rail or a first guide belt and at least one second guide rail or at least one second guide belt, wherein the first guide rail or the first guide belt and the at least one second guide rail or the at least one second guide belt run at least sectionally parallel and on a common, in particular horizontal, plane extending parallel to the conveyor system.

In the predefined or definable section or portion of the dishwasher, the at least one second guide rail or the at least one second guide belt runs parallel to the first guide rail or to the first guide belt, however on an in particular horizontal plane extending parallel to the conveyor system, in particular horizontal plane that is different from the particular horizontal plane that runs parallel to the conveyor system, in which the first guide rail or the first guide belt extends in the predefined or definable section and preferably also outside of the predefined or definable section or portion of the dishwasher.

In other words, in this embodiment, it is provided that a guide rail or a guide belt, when viewed in the transport direction of the conveyor system, is slightly offset horizontally upwards or downwards relative to the first guide rail or the first guide belt, as a result of which a tilting movement of the dishes/drinking containers supported by the first and second guide rails and the first guide belt, respectively, is forced.

Preferably, the at least one guide also comprises a guide running laterally to the retaining elements in order to in particular laterally guide the dishes received or retained by the retaining elements, in particular drinking containers, when they are transported from a loading section of the dishwasher to and through the treatment section of the dishwasher using the conveyor system and the retaining elements.

The circulating conveyor system is configured in order to transport the retaining elements connected to the conveyor system with any dishes, in particular drinking containers, received or retained by the retaining elements to the dishwasher and above all through different sections or portions of the dishwasher. According to preferred implementations, the conveyor system comprises a corresponding drive, which is in particular an electromotive drive. The conveyor system is operatively connected or operatively connectable to this in particular electromotive drive.

It can be appreciated that the conveyor system can be stadium-shaped when viewed from above, wherein a compactness of the dishwasher can be improved when the conveyor system is in particular meander-shaped when viewed from above. In this way, a variety of different treatment zones of the dishwasher can be implemented even when the space is relatively small.

The various sections or portions of the dishwasher comprise the following, in particular:

a loading section of the dishwasher, in which the dishes, in particular drinking containers, to be cleaned are releasably connectable to at least one retaining element of the conveyor, preferably aligned upside-down, in particular manually and in particular at least sectionally or partially in a positively locking manner;

a treatment section of the dishwasher, in which the dishes received or retained by the retaining elements, in particular drinking containers, are treatable, in particular washable and rinsable and, if necessary, dryable;

if necessary, a feeding section of the dishwasher provided between the loading section and the treatment section, in which the dishes received in the loading section, in particular drinking containers, are fed to the treatment section;

an unloading section of the dishwasher, in which the dishes received or retained by the retaining elements, in particular drinking containers, can be discharged or unstacked from the dishwasher after their treatment in the treatment section of the dishwasher; and a return section of the dishwasher in which the retaining elements are transported from the unloading section of the dishwasher back to the loading section of the dishwasher with the aid of the conveyor system.

The problem underlying the invention is further solved by the subject-matter of claim 15, which relates to a dishwasher, in particular for a coffee shop and/or for a fast-food restaurant, for cleaning of dishes. The dishes to be treated/ cleaned with the dishwasher are, for example, dishes that are preferably exclusively provided by the coffee shop or the fast-food restaurant.

In the dishwasher according to the invention, it is provided that it comprises an input or insertion section configured in particular as a return device and preferably as a return machine for reusable dishes.

The dishwasher according to the invention further comprises a conveyor of the aforementioned type for transporting the dishes from the input or insertion section of the conveyor to a treatment section of the dishwasher and from there to an output or removal section of the dishwasher. The treatment section of the dishwasher is associated with a washing and rinsing system for washing and rinsing the dishes and, if necessary, a drying system for drying the rinsed dish, said drying system being located downstream when viewed in the transport direction of the dish.

The input or insertion section associated with the dishwasher, and adapted as a return device, and in particular adapted as a return machine for reusable dishes need not be part of the dishwasher itself. This can in particular be a return station arranged remotely from the actual dishwasher that is ultimately connected to the dishwasher with the conveyor in order to feed the dishes deposited by a customer at the input or insertion section in particular to the treatment section of the dishwasher.

For example, it can be provided that the input or insertion section associated with the dishwasher, in particular as a return device, and preferably in particular as a return machine for reusable dishes, is arranged separately from the treatment section of the dishwasher, and in particular from an inlet tunnel of the dishwasher leading to the treatment section of the dishwasher.

Preferably, the input or insertion section associated with the dishwasher, and in particular adapted as a return device, preferably in particular adapted as a return machine for reusable dishes, comprises a refund device.

Alternatively or additionally, it is conceivable that the input or insertion section associated with the dishwasher and in particular adapted as a return device and preferably in particular adapted as a return machine for reusable dishes, comprises a user interface and an identification device for dishes that cooperates with a data processing device and a data storage device, wherein the identification device in particular comprises an optical detection system and/or wherein the identification device is adapted for barcode recognition, RFID detection, three-dimensional surface analysis, 3D matching, logo recognition, OCR detection, and/or color detection.

According to realizations of the invention, it is provided that the input or insertion section associated with the dishwasher and in particular adapted as a return device and preferably in particular adapted as a return machine for reusable dishes has at least one access opening for receiving dishes, wherein the access opening is associated with a closing element adjustable between an open position and a closed position.

In this context in particular, it is possible that the input or insertion section associated with the dishwasher and in particular adapted as a return device and preferably in particular adapted as a return machine for reusable dishes, has at least one access opening with an outline corresponding to the dish to be cleaned to specify an orientation of the dish when manually placing the dish in the input or insertion section.

According to realizations of the dishwasher according to the invention, it is provided that the dishwasher, and in particular the input or insertion section associated with the dishwasher, and in particular adapted as a return device, and in particular preferably adapted as a return machine for reusable dishes, comprises a device for sorting the dishes according to their size and/or type, wherein the dishes, sorted by size and/or type, are in particular automatically fed to a corresponding transport lane of the conveyor.

According to embodiments of the dishwasher according to the invention, it is provided that a stacking apparatus is provided in the transport direction of the dishes when viewed in downstream direction of the drying system in the output or removal section of the dishwasher for automatically stacking the dishes dried in the drying system.

The stacking apparatus can be adapted to stack the dishes dried in the drying system—in particular by size and/or dish type—in a corresponding dish stack.

The dishwasher preferably has a length of about 1 to 3 meters, a height of about 1 to 1.75 meters, and a width of about 0.3 to 1 meter.

Preferably, the input or insertion section associated with the dishwasher is embodied as a dishes return system, similar to an empty container return system, and forms the user interface with the customer of the coffee shop or fast-food restaurant. For this purpose, the input or insertion section of the dishwasher comprises at least one access opening for receiving dishes, wherein the access opening is associated with a closing element adjustable between an open position and a closed position.

The customer of the coffee shop or fast-food restaurant places the dish to be cleaned at the access opening of the input or insertion section of the dishwasher.

The user interface of the dishwasher at the input or insertion section preferably comprises an identification device having a data processing device and a data storage device, the identification device being adapted to identify the dish placed by the customer at the at least one access opening at the input or insertion section of the dishwasher.

For example, the identification device can comprise an optical detection system. Alternatively or additionally, the identification device can be adapted for barcode recognition, RFID recognition, three-dimensional surface analysis, 3D matching, logo recognition, OCR recognition, and/or color recognition. A customer of the coffee shop or fast-food restaurant can place a dish to be returned, for example a beverage cup, at the at least one access opening into the input or insertion section of the dishwasher. The identification device is used to identify what dish, for example what dish type (beverage cup, plates, etc.), is involved. Preferably, the identification device or the data processing device associated with the identification device is further adapted to identify whether the dish is a dish served or accepted by the coffee shop operator or the fast-food restaurant operator.

If the dish is identified as a dish stored in the data storage device and accepted by the operator of the dishwasher, for example the coffee shop operator or the fast-food restaurant operator, an amount to be refunded for this item can be displayed on a display of the user interface. Said amount can for example be paid out in the form of a cash disbursement. However, it is also possible that the person is granted a credit, wherein the purchase price of a new beverage or food item is reduced by the amount refunded for the returned dish. The person can then decide if they would like to have the appropriate amount paid out or wish to buy a new food item/merchandise at a reduced price.

An option is also conceivable according to which the person rejects the amount to be refunded and removes the dish from the input or insertion section of the dishwasher. Likewise, the person can be prompted to remove the dish from the input or insertion section of the dishwasher if the placed dish could not be identified.

Accordingly, the input or insertion section associated with the dishwasher is adapted as a return machine for reusable dishes and preferably has a refund device.

With regard to the refund device, it is generally conceivable that the person will be issued a paper slip or paper ticket as is known on empty container machines.

However, a paperless and customer-simplified refund slip preparation method is preferred. A paperless method could be to transmit such a refund slip to a smartphone. Transmission to the smartphone can be accomplished by wireless devices. One of these works, for example, by means of NFC (Near Field Communication). Because most smartphones and many credit cards support this transmission standard, it is also preferable to pay for further merchandise/food items in the coffee shop/fast-food restaurant at a later date using this transmission standard.

Preferably, the input or insertion section, in particular adapted as a return machine, is separated from the washing and rinsing system as well as the downstream drying system of the dishwasher such that only the input or insertion section, embodied as a return machine, is visible to the customer.

In this context, it is in particular suitable for the input or insertion section of the dishwasher to have at least one access opening for receiving dishes, wherein the access opening is associated with a closing element that is adjustable between an open position and a closed position. The closing element associated with the at least one access opening preferably opens automatically after actuation of a corresponding switch in the user interface of the input or insertion section of the dishwasher. It is also conceivable to manipulate the closing element by means of a proximity sensor.

The input or insertion section of the dishwasher associated with the dishwasher is connected to the dishwasher and the treatment zones of the dishwasher by the conveyor such that the dish placed by the customer at the input or insertion section can be fed to the washing and rinsing system and subsequently to the drying system. It is preferred that the treatment zones of the dishwasher are not visibly arranged for the customer, for example behind a corresponding building partition or the like.

In this way, the dishwasher can be integrated in the coffee shop or fast-food restaurant in a particularly harmonious manner.

If the customer placed the dish at the input or insertion section of the dishwasher adapted as the return machine, and if the optionally provided identification device accepted the placed dish, the latter is then transported into the treatment zones of the dishwasher with the aid of the conveyor, where a wash cycle, then a rinse cycle, if necessary a disinfection cycle, and then a drying cycle take place. With the aid of a stacking apparatus, the cleaned dish is then automatically stacked at the (clean side) output or removal section of the dishwasher.

According to preferred implementations of the dishwasher according to the invention, the input or insertion section of the dishwasher comprises at least one access opening with an outline corresponding to the dish to be cleaned, in order to specify an orientation of the dish when manually placing the dish into the input or insertion section.

This is a particularly easily implemented method that is also easy to understand for the customer, in particular based on the Poka-Yoke principle, to indicate to the customer in which orientation the dish is to be placed. Preferably, the dish should be introduced into the input or insertion section in an upside-down orientation.

According to preferred implementations of the dishwasher according to the invention, the dishwasher comprises a device for automatically determining the cleanliness of the dishes cleaned by the washing and rinsing system. This measure ensures that only sufficiently cleaned dishes are output at the output or removal section of the dishwasher, which can then be reused by the coffee shop operator or the fast-food restaurant operator for serving foods.

The means for determining the cleanliness of the dishes cleaned in the washing and rinsing system preferably operates automatically to facilitate an objective assessment. For example, a camera can be used to capture a digital image of the dish to be inspected. Further, the device can comprise a controller for processing the captured digital image.

The means for automatically determining the cleanliness of the dishes cleaned in the washing and rinsing system is preferably tailored specifically to the dishes to be inspected, which can include providing suitable lighting, camera settings, and camera position relative to the dish being washed. In this way, the inspection system can generate a brightness value according to controlled environmental settings.

In accordance with further embodiments of the lastly mentioned aspect, it can be provided that a dish is automatically recycled to the wash and rinse system if the cleanliness value does not correspond to a predefined threshold value. Alternatively, it is conceivable to place a dish identified as being insufficiently clean in a predefined section of the output or removal section of the dishwasher.

The input or insertion section associated with the dishwasher or a section of the dishwasher upstream of the treatment section of the dishwasher can be adapted as a storage section for temporarily storing a predefined or specifiable number of dishes to be cleaned.

The same applies alternatively or in addition to this for the output or removal section of the dishwasher.

In this context, it is conceivable that the dishwasher comprises a control device adapted to control the conveyor such that the conveyor transports the dishes to be cleaned discontinuously, e.g., in a chronologically interrupted manner, from the input or insertion section of the dishwasher through the washing and rinsing system and drying system to the output or removal section of the dishwasher, preferably also at different speeds.

Alternatively, however, it is also conceivable for the dishwasher to comprise a control adapted to control the at least one conveyor such that the at least one conveyor transports the dishes to be cleaned continuously through the washing and rinsing system, and in particular at a predefined or specifiable transport speed, through the at least one treatment zone.

The dishwasher can further comprise a control device for controlling the conveyor and/or controllable components associated with the washing and rinsing system and/or the drying system. It is expedient that the conveyor and, if necessary, the controllable components associated with the washing and rinsing system and/or the drying system can be controlled as a function of a presence or absence, or as a function of a number of dishes in the input or insertion section and/or the output or removal section of the dishwasher.

Preferably, the washing and rinsing system as well as the drying system and in particular also the output or removal section of the dishwasher are centrally accommodated in a dishwashing section, whereby the input or insertion section of the dishwasher adapted as a return machine is arranged spatially separated therefrom.

The inventive solution even gives a coffee shop or fast-food restaurant economic advantages by switching from disposable tableware to reusable tableware, since no logistics are to be provided in particular in the form of workers to collect the soiled tableware.

BRIEF DESCRIPTION OF THE DRAWINGS

Exemplary embodiments of the present invention are described in more detail in the following with reference to the accompanying drawings.

The following are shown:

FIG. 3 schematically and in an isometric view, the conveyor used in the exemplary embodiment of the dishwasher according to FIG. 1 with dishes (drinking containers) received by the retaining elements of the conveyor;

FIG. 8 schematically and in a plan view, the exemplary embodiment of the conveyor according to the invention according to FIG. 4, but without dishes/drinking containers received by the retaining elements of the conveyor;

DETAILED DESCRIPTION

Figure 1:
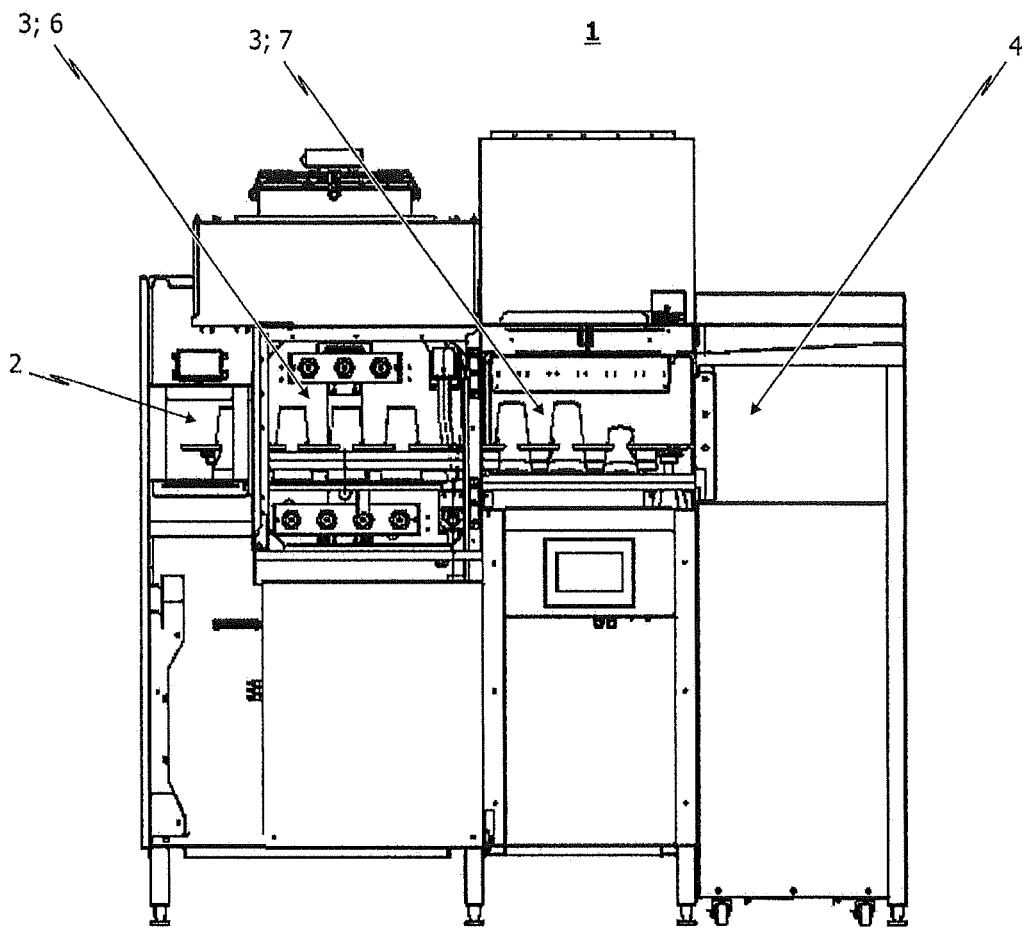
FIG. 1 schematically and in a partially cut side view, an exemplary embodiment of the dishwasher according to the invention with one configuration of the conveyor according to the invention.
Figure 2:
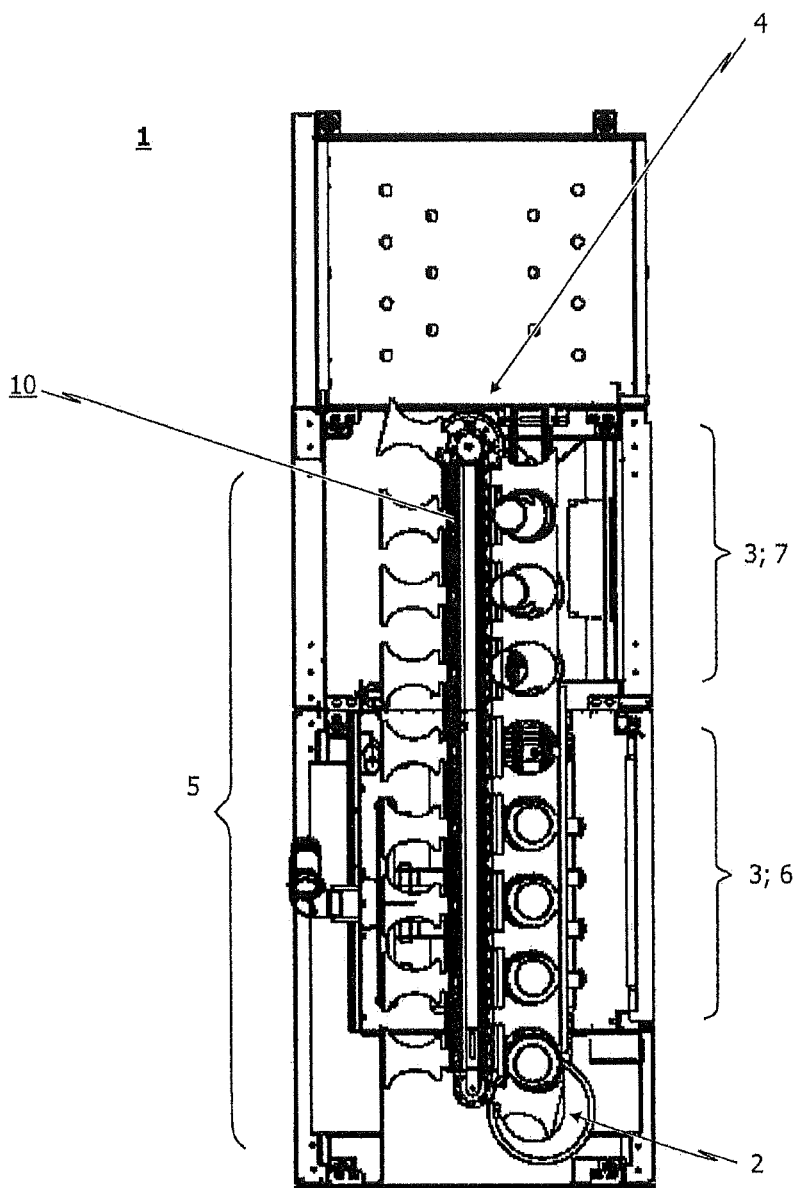
FIG. 2 schematically and in a partially cut plan view, the exemplary embodiment of the dishwasher according to the invention according to FIG. 1.
Figure 4:
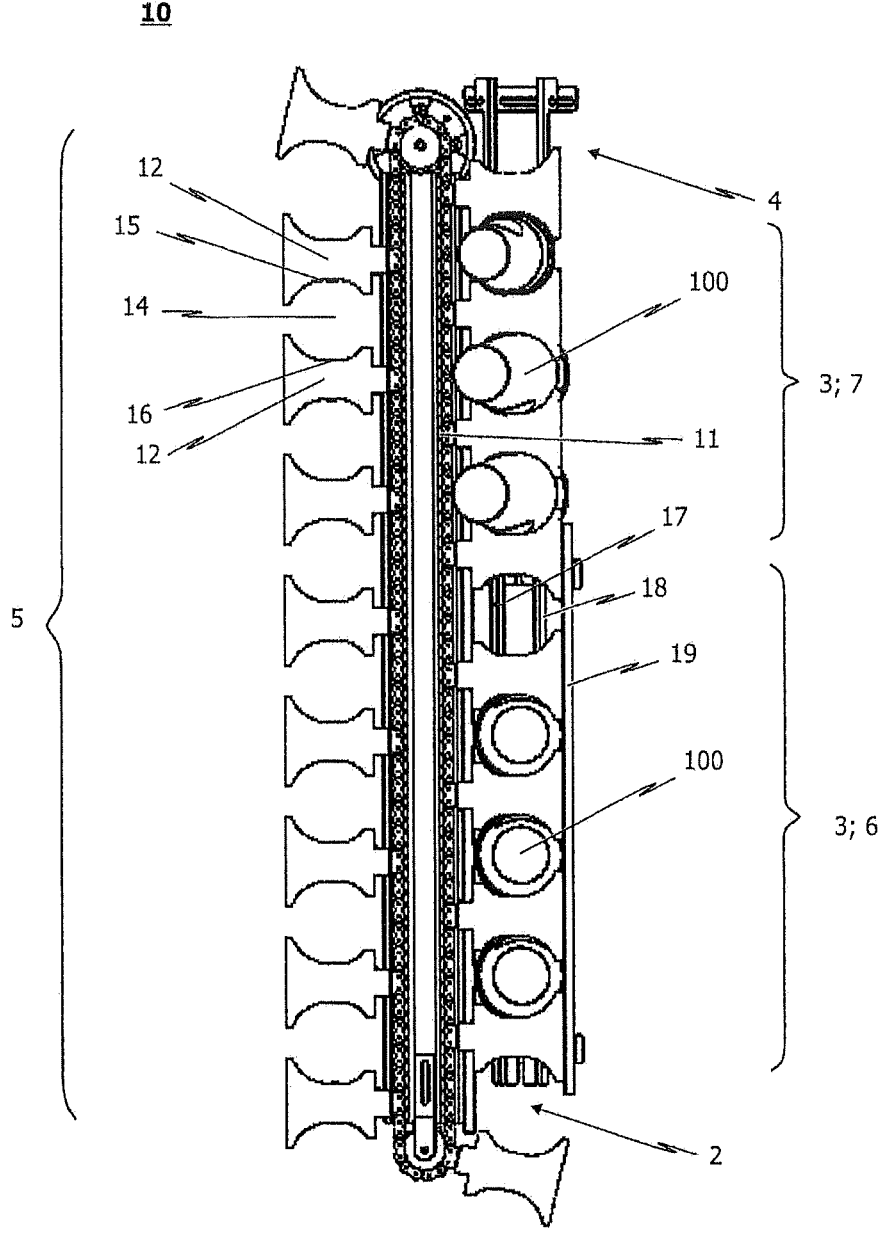
FIG. 4 schematically and in a plan view, the exemplary embodiment of the conveyor according to the invention according to FIG. 3.
Figure 5:
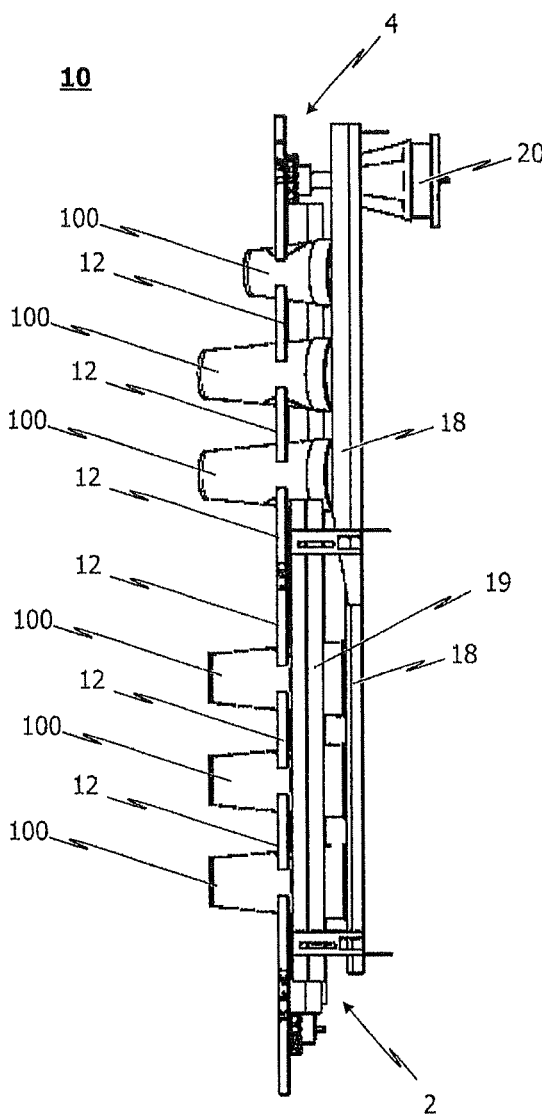
FIG. 5 schematically and in a side view, the exemplary embodiment of the conveyor according to the invention according to FIG. 4.
Figure 6:
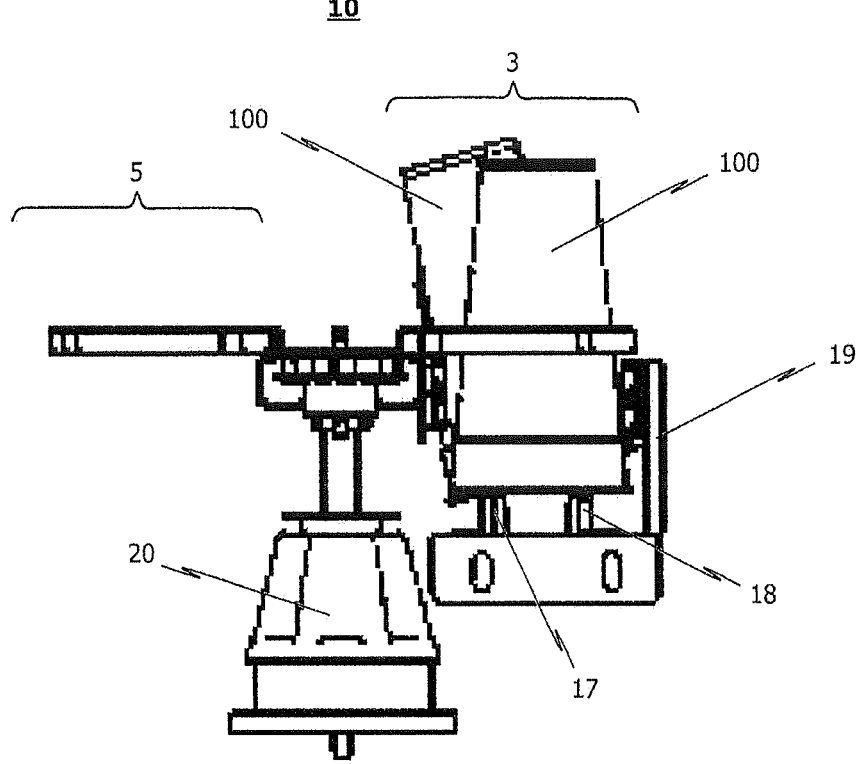
FIG. 6 schematically and in a longitudinal view in the direction of transport of the dishes, the exemplary embodiment of the conveyor according to the invention according to FIG. 4.
Figure 7:
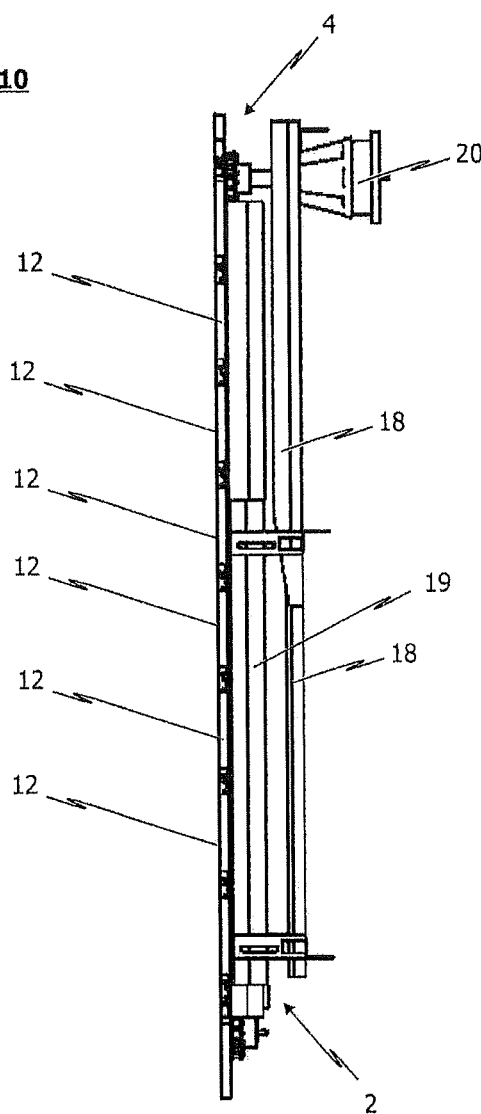
FIG. 7 schematically and in a side view, the exemplary embodiment of the conveyor according to the invention according to FIG. 5, but without dishes/drinking containers received by the retaining elements of the conveyor.

An exemplary embodiment of the dishwasher 1 according to the invention is shown schematically in FIG. 1 and FIG. 2. The dishwasher 1 is in particular suitable for coffee shops or fast-food restaurants where reusable tableware is used that is returned by the customer.

For this purpose, the dishwasher 1 according to the exemplary embodiment shown in FIG. 1 and FIG. 2 has an input or insertion section 2. The input or insertion section 2 can, for example, be embodied as a return machine for reusable dishes.

In the present case, the invention, i.e., the transport washer 1 according to the invention and the conveyor 10 of the dishwasher 1 according to the invention, is described in connection with the cleaning of drinking containers 100. The drinking containers 100 are in particular cup-shaped drinking containers, which are issued in coffee shops or fast-food restaurants for warm drinks (coffee drinks, etc.) or cold drinks.

However, the solution according to the invention is not limited to the transport or treatment of such a dish type. By easily modifying and adjusting the retaining elements 12, 13 of the conveyor 10, the dishwasher 1 or the conveyor 10 is also suitable for other and in particular for several different types of dishes to be cleaned, such as plates, bowls, etc.

The dishwasher 1 according to the invention and the conveyor 10 according to the invention, as shown in the accompanying drawings, are in particular suitable for the (safe) transport and treatment of dishes of different sizes and/or shapes. In the exemplary embodiments shown in the drawings, in particular, different sizes of drinking containers 100 are used.

The input or insertion section 2 of the dishwasher 1, which as stated can in particular be designed as a return machine for reusable dishes, is preferably set up so as to be accessible to the customer of the coffee shop or fast-food restaurant. It can include a user interface and an identification device for dishes that cooperates with a data processing device and a data storage device in order to identify the dish returned by the customer or placed at the input or insertion section 2 of the dishwasher 1.

Preferably, the input or insertion section 2 of the dishwasher 1 comprises at least one access opening, wherein the access opening can be associated with a closing element that is closable between an open position and a closed position.

From the input or insertion section 2 of the dishwasher 1, the placed and any accordingly identified dish 100 is transported to the treatment section of the dishwasher 1 with the aid of the conveyor 10. The treatment section of the conveyor 1 is in particular a treatment zone 6 with a washing and rinsing system as well as a downstream drying zone 7 when viewed in the transport direction of the dishes 100.

Preferably, the input or insertion section 2 of the dishwasher 1 has at least one access opening with an outline corresponding to the dish 100 to be cleaned in order to specify an orientation of the dish 100 when manually placing the dishes 100 into the input or insertion section 2.

Alternatively or additionally, the dishwasher 1 can comprise, preferably at the input or insertion section 2 or upstream of the treatment section 6, 7 of the conveyor 1, a device for sorting the dishes 100 according to their size and/or type, wherein the dishes 100, can be sorted by size and/or type, are then fed to the respective treatment zones 6, 7 of the conveyor 1.

In the exemplary embodiments of the conveyor 10 shown in the drawings, it comprises overall a single transport track, which is configured so to transport the dishes 100 to be cleaned in a row to the dishwasher 1 and through the dishwasher 1.

In principle, however, it is also conceivable that the conveyor 10 comprises a plurality of transport lanes running in parallel, which are adapted to simultaneously and in parallel transport at least two dishes 100 through the dishwasher 1.

A stacking apparatus can be provided at the output or removal section 4, which is configured so as to stack the dishes 100 dried in the drying system 7 of the conveyor 1 into a corresponding stack of dishes.

Alternatively, however, it is also conceivable that the cleaned and dried dishes 100 are output into a section or a container or the like provided at the output or removal section 4 of the dishwasher 1, i.e., without forming a stack.

The dishwasher 1 according to the present invention, as shown schematically on the basis of an exemplary embodiment in FIG. 1 and FIG. 2, is in particular characterized by a special conveyor 10 that is adapted and optimized in particular for use of the dishwasher 1 in a coffee shop and/or in a fast-food restaurant. The conveyor 10 used in the dishwasher 1 shown in FIG. 1 and FIG. 2 will now be described in further detail with reference to the illustrations in FIG. 3 to FIG. 8.

As already indicated, the exemplary embodiment of the conveyor 10 shown in FIG. 3 to FIG. 8 serves in particular to transport drinking containers 100 to be cleaned to and from the dishwasher 1. However, the use of the conveyor 10 for transporting drinking containers 100 is not to be considered as limiting.

In general, the conveyor 10 comprises a circulating conveyor system, in particular in the form of a circulating transport chain or in the form of a circulating conveyor belt. A plurality of retaining elements 12 is connected to the circulating conveyor system. The retaining elements 12 are configured so as to receive the dishes 100 (here: drinking containers) that are to be cleaned in a releasable manner, in particular in a positively locking manner and preferably at least in a regionally or partially positively locking manner, and then hold them releasably.

The exemplary embodiment of the conveyor 10 according to the invention shown in FIG. 3 to FIG. 8 further comprises a support system 17, 18, 19 for at least partially and/or sectionally supporting the dishes 100 received by the retaining elements (here: drinking containers).

In the exemplary embodiment of the conveyor 10 according to the invention shown in FIG. 3 to FIG. 8, the retaining elements 12 are preferably respectively configured as pusher dogs that radially protrude from the conveyor system 11 with respect to the conveying direction of the circulating conveyor system 11 and are at least partially or sectionally horizontally transported with the circulating conveyor system 11. In particular, a pocket-shaped receiving section 14 is formed between two adjacent pusher dogs 12. In this pocket-shaped receiving section 14, a dish 100 (here: a drinking container) is at least partially or sectionally receivable.

In particular, in the exemplary embodiment of the conveyor 10 according to the invention shown in FIG. 3 to FIG. 8, it is provided that the pocket-shaped receiving section 14 is formed between two adjacent pusher dogs 12, namely by a first circular segment-shaped section 15 of a first pusher dog 12 and by a second circular segment-shaped section 16 of a second pusher dog 12 adjacent to the first pusher dog 12.

Although not shown in the drawings, it is generally conceivable that the pocket-shaped receiving section 14 formed by the retaining elements 12 is designed at least partially or sectionally so as to be flexible such that, in the pocket-shaped receiving section 14, dishes 100 (here: drinking containers) of different sizes and in particular having different diameters or a different external geometry are at least partially or sectionally receivable.

As an alternative to the retaining elements 12 used in the conveyor 10 shown in FIG. 3 to FIG. 8, in which the pocket-shaped receiving section 14 is formed or can be formed between two adjacent retaining elements 12, it is also conceivable the retaining elements 12 are embodied as pusher dogs, wherein each pusher dog itself comprises a pocket-shaped and preferably in particular a star pocket-shaped receiving section 14, in which a dish, such as a drinking container, is at least partially or sectionally receivable. In this context, it is in particular conceivable that the pocket-shaped receiving section 14 is formed by at least one circular segment-shaped portion of the pusher dog itself.

Of course, however, other configurations for the retaining elements 12, 13 are also used, such as those illustrated in FIG. 9, FIG. 10, FIG. 11, and FIG. 12.

Figure 9:
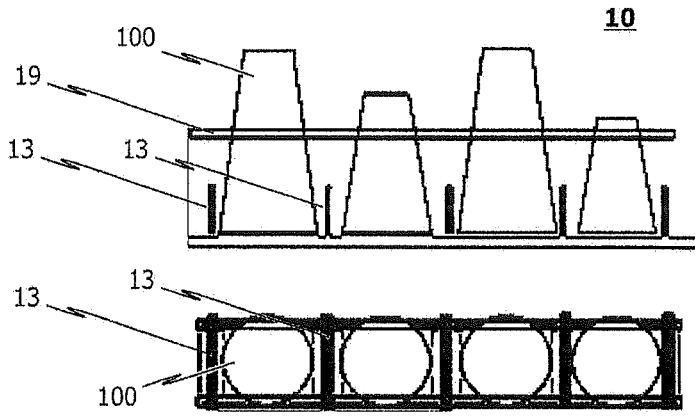
FIG. 9 schematically and in a side view and plan view, a further exemplary embodiment of the conveyor according to the invention.
Figure 10:
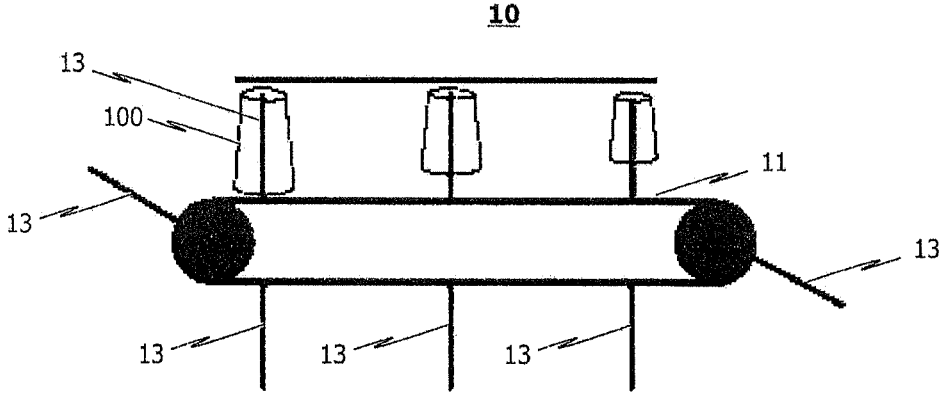
FIG. 10 schematically and in a side view, an alternative embodiment of the conveyor according to the invention.
Figure 11:
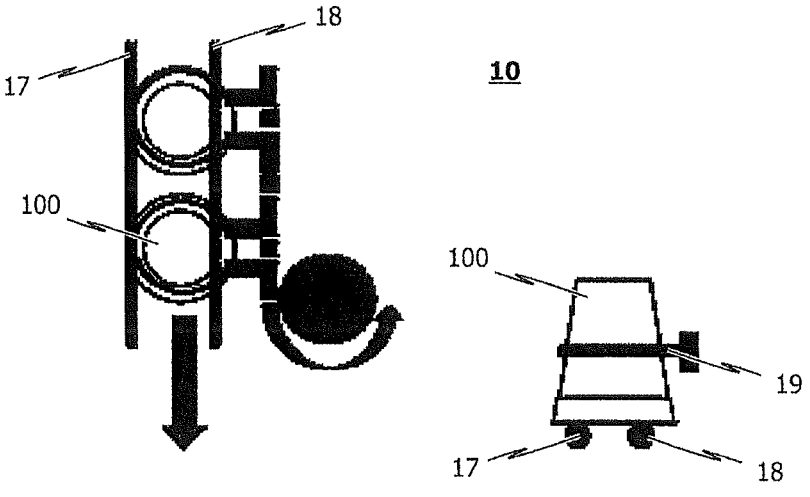
FIG. 11 schematically and in a plan view or a longitudinal view, an alternative configuration of the conveyor according to the invention.
Figure 12:
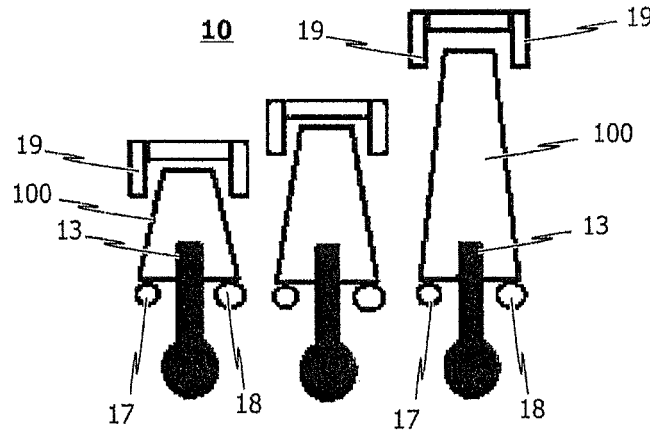
FIG. 12 schematically and in a side view, an alternative embodiment of the conveyor according to the invention.

The configurations of the conveyor 10 shown schematically in FIG. 9, FIG. 10, and FIG. 12 have in common that the retaining elements of the conveyor 10 are respectively configured as receiving fingers or receiving pins 13 that project radially from the conveyor system 11 with respect to the conveying direction of the circulating conveyor system 11 and are at least regionally or portionally vertically transported with the circulating conveyor system 11, wherein each receiving finger or receiving pin 13 is configured in particular in order to at least partially or regionally receive an upside-down oriented drinking container 100.

However, it is also conceivable that between two adjacent receiving fingers or receiving pins 13, a drinking container 100, which is in particular aligned upside-down, is received (cf. FIG. 9).

The support system 17, 18, 19 of the conveyor 10 according to the invention comprises at least one guide extending at least sectionally parallel to the conveyor system 11.

In the embodiments of the conveyor 10 according to the invention shown in the drawings, the at least one guide extending at least sectionally parallel to the conveyor system 11 is statically formed. It is also conceivable, however, that the guide runs at least sectionally to the conveyor system 11 and in particular concurrently with the conveyor system 11 when the conveyor system 11 is in operation.

In this context, it can be specifically appreciated that the at least one guide runs below the retaining elements 12, 13 and serves in particular to vertically support the dishes 100 (here: drinking containers) received or retained by the retaining elements.

However, as shown in FIG. 10, it is also conceivable that such a guide also extends above the retaining elements 12, 13. The same applies to the design variant shown schematically in FIG. 12.

In the embodiment of the conveyor 10 according to the invention shown in FIG. 3 to FIG. 8, the at least one guide extending below the retaining elements 12, 13 comprises at least one guide rail 17, 18, which extends at least sectionally parallel to the conveyor system 11, and at least one guide belt, which extends at least sectionally parallel to the conveyor system 11.

As shown in the drawings, in all exemplary embodiments of the conveyor 10 according to the invention, it is preferably provided that the retaining elements 12, 13 are arranged such that drinking containers 100 to be cleaned are receivable upside down. In the case of the conveyor 10 according to the invention, it is in particular provided that, in a state having been received by the retaining elements, the drinking containers 100 are pivotably mounted about an axis parallel to the conveyor system 11 relative to the conveyor system 11.

In order to pivot the drinking containers 100 received by the retaining elements about the axis extending parallel to the conveyor system 11 in a predefined or definable section or portion of the dishwasher 1, it is provided in the exemplary embodiment of the conveyor 10 according to the invention shown schematically in FIG. 3 to FIG. 8 that the at least one guide rail 17, 18 or at least one guide belt is configured such that, during transport of the drinking containers 100 received by the retaining elements, the drinking containers 100 are pivoted about the axis extending parallel to the conveyor system 11.

Specifically, in the embodiment illustrated in FIG. 3 to FIG. 8, a first guide rail 17 or a first guide belt and a second guide rail 18 and a second guide belt are used, wherein the first guide rail 17 or the first guide belt and the second guide rail 18 and the second guide belt run at least sectionally parallel and in a common, in particular horizontal, plane extending parallel to the conveyor system 11.

In the predefined or definable section or portion of the dishwasher 1, in which the drinking containers 100 received by the retaining elements 12 are to be pivoted about the axis extending parallel to the conveyor system 11, on the other hand, the second guide rail 18 or the second guide belt is still parallel to the first guide rail 17 or to the first leader belt, however, in an in particular horizontal plane that extends parallel to the conveyor system 11, which is different from the in particular horizontal plane that runs parallel to the conveyor system 11 in which the first guide rail 17 or the first guide belt extends. In this way, the desired pivoting of the dishes 100 is achieved.

The circulating conveyor system 11 of the conveyor 10 according to the invention is configured in order to transport the retaining elements 12, 13 connected to the conveyor system 11 with any dishes (here: drinking containers 100) received or retained by the retaining elements 12, 13 through different sections or portions of the dishwasher 1. For this purpose, the conveyor system 11 comprises a corresponding drive 20, in particular an electromotive drive.

A control device (not explicitly shown in the drawings) is associated with the drive 20 of the conveyor system 11, which is configured so to actuate the drive 20, in particular as needed. The control device is preferably configured so as to, in particular as needed, automatically or optionally automatically, actuate the drive 20 such that the retaining elements 12, 13 are continuously transported with the conveyor system 11 at a constant transport speed or at a varying transport speed through the sections or portions of the dishwasher 1.

Alternatively, the control device is configured so as to drive the conveyor system 11 only when a dish has been placed in the input or insertion section 2 so as to again prepare the input or insertion section 2 for receiving a further dish.

It is conceivable that the control device is configured so as to, in particular as needed, automatically or optionally automatically, actuate the drive 20 such that the retaining elements 12, 13 are transported with the conveyor system 11 discontinuously and in particular in a stepwise manner through the sections or portions of the dishwasher 1. The discontinuous transport is preferably selected such that, in particular in a sensor-controlled manner, the conveyor system 11 always transports the retaining elements 12, 13 further by an in particular predefined or definable distance when at least one dish is received in the input or insertion section 2 or in the loading section of the dishwasher 1.

As has already been explained in the context of the exemplary embodiment of the dishwasher 1 according to the invention shown schematically in FIG. 1 and FIG. 2, the dishwasher 1 comprises different sections or portions. These include, in particular, a loading section 2 of the dishwasher 1 corresponding to the input or insertion section of the dishwasher 1, in which the dishes (here: drinking containers 100), to be cleaned are releasably connectable to at least one retaining element 12, 13 of the conveyor 10, preferably aligned upside-down, in particular manually and in particular at least sectionally or partially in a positively locking manner.

When viewed in the transport direction of the dishes 100, the loading section 2 of the conveyor 1 is followed by a treatment section 3 of the dishwasher 1, in which the dishes 100 received or retained by the retaining elements 12, 13 are treatable, in particular washable and rinsable and, if necessary, dryable.

Contrary to the exemplary embodiment of the dishwasher 1 according to the invention shown in FIG. 1 and FIG. 2, between the loading section 2 of the dishwasher 1 and the treatment section 3 of the dishwasher 1, an interposed feeding section of the dishwasher 1 can be formed, in which the dishes 100 received in the loading section 2 are fed to the treatment section 3. Such a feeding section is in particular suitable when the input or insertion section 2 of the dishwasher 1 is configured remotely from the actual treatment section 3 of the dishwasher 1.

When viewed in the transport direction of the dishes 100, the treatment section 3 of the dishwasher 1 is followed by an unloading section 4 of the dishwasher 1, in which the dishes 100 received or retained by the retaining elements 12, 13 can be discharged or unstacked from the dishwasher 1 after their treatment in the treatment section 3 of the dishwasher 1.

Next, there is a return section 5 of the dishwasher 1 in which the retaining elements 12, 13 are transported from the unloading section 4 of the dishwasher 1 back to the loading section 2 of the dishwasher 1 with the aid of the conveyor system 11.

Figure 13:
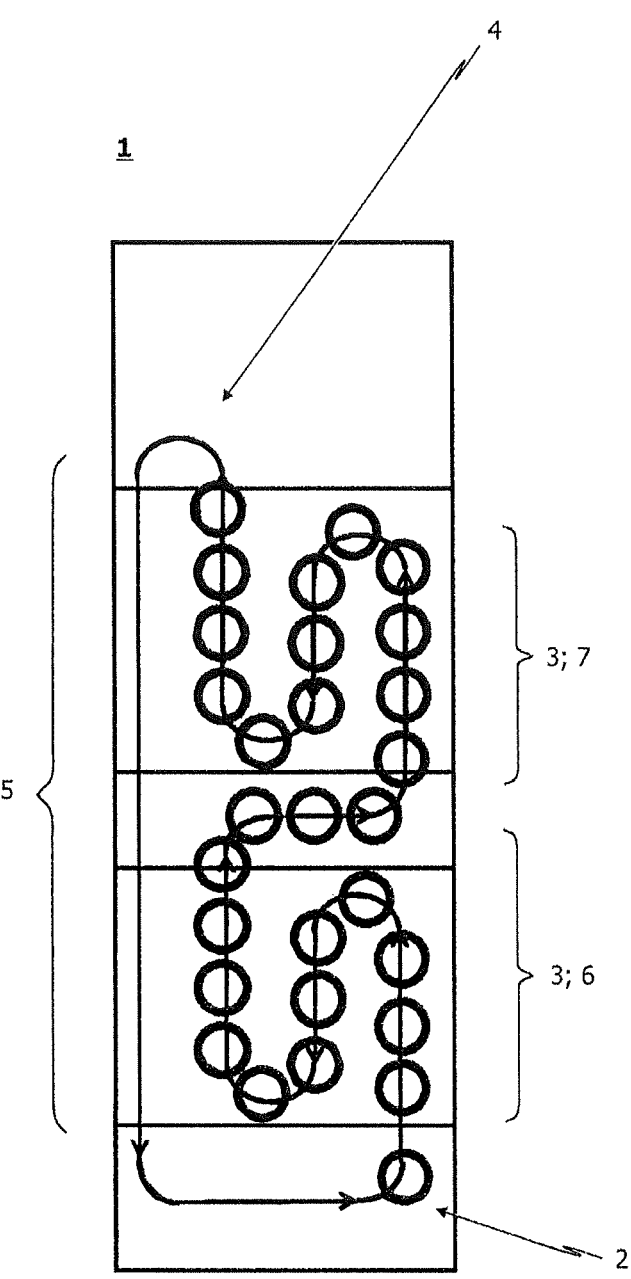
FIG. 13 schematically and in a plan view, an alternative embodiment of the conveyor in which the conveyor system is meandering.

As indicated in FIG. 13, in this context, it can be appreciated in particular that the conveyor system 11 of the conveyor 10 is meandering in form, so that the transport path specified by the conveyor system 11 can pass through the different sections/portions of the dishwasher 1 without thereby at least significantly enlarging the installation area of the dishwasher 1.

However, instead of such a meandering path, it is of course also conceivable that the conveyor system 11, when viewed from above, runs in a stadium-like manner, as is the case in the exemplary embodiment of the conveyor 10 according to FIG. 3 to FIG. 8.

The invention is not limited to the embodiments shown in the drawings, but results when all of the features disclosed herein are considered together.

LIST OF REFERENCE NUMERALS

1 Dishwasher
2 Loading section/input or insertion section of the dishwasher
3 Treatment section of the dishwasher
4 Unloading section/output or removal section of the dishwasher
5 Return section of the dishwasher
6 Washing/rinsing zone
7 Drying zone
10 Conveyor
11 Conveyor system
12 Retaining element/Pusher dog
13 Retaining element/receiving finger or receiving pin
14 Star pocket-shaped receiving section
15 First circular segment-shaped portion
16 Second circular segment-shaped portion
17 First guide rail/first guide belt
18 Second guide rail/second guide belt
19 Lateral guide
20 Drive
100 Dish

The invention claimed is:

1. A dishwasher for a coffee shop and/or for a fast-food restaurant for cleaning drinking containers, wherein the dishwasher comprises:

at least one treatment section having at least one treatment zone with a washing system and/or a rinsing system;

a conveyor arranged for (i) transporting drinking containers through the at least one treatment zone of the dishwasher and/or (ii) feeding drinking containers to the dishwasher, wherein the conveyor comprises:

a circulating conveyor system;

a plurality of retaining elements connected to the circulating conveyor system and configured in order to releasably receive and/or releasably retain drinking containers at least in a sectionally or partially positively locking manner; and a support system for at least partially and/or sectionally supporting drinking containers, received by the retaining elements, wherein the conveyor system is arranged to travel in a looped path, wherein each retaining element of the plurality of retaining elements follows the looped path and is configured to cooperate with an adjacent retaining element traveling along the looped path to form an area for capturing a drinking container therein such that, during operation, the drinking container is at least partly bounded on a both a leading side and a trailing side, relative to a conveying direction, by two sequential retaining elements traveling along the looped path.

2. The dishwasher according to claim 1, wherein the retaining elements are respectively configured as pusher dogs that radially protrude from the conveyor system with respect to the conveying direction of the circulating conveyor system and are at least sectionally or portionally horizontally transported or transportable with the circulating conveyor system, wherein each pusher dog comprises a pocket-shaped receiving section, in which a drinking container is at least partially or sectionally receivable, wherein the pocket-shaped receiving section is formed by at least one circular segment-shaped portion of the pusher dog.

3. The dishwasher according to claim 2, wherein the pocket-shaped receiving section, at least partially or sectionally, is designed in order to be flexible in such a way that, in the pocket-shaped receiving section, drinking containers of different sizes are at least partially or sectionally receivable.

4. The dishwasher according to claim 1, wherein the retaining elements are respectively configured as pusher dogs that radially protrude from the conveyor system with respect to the conveying direction of the circulating conveyor system and are at least sectionally or portionally horizontally transported with the circulating conveyor system, wherein, between two adjacent pusher dogs a pocket-shaped receiving section is or can be formed, in which a drinking container is at least partially or sectionally receivable, wherein the pocket-shaped receiving section between two adjacent pusher dogs is formed by a first circular segment-shaped portion of a first pusher dog of the two adjacent pusher dogs and by a second circular segment-shaped portion of a second pusher dog of the two adjacent pusher dogs.

5. The dishwasher according to claim 1, wherein the retaining elements are respectively configured as receiving fingers or receiving pins that project radially from the conveyor system with respect to the conveying direction of the circulating conveyor system and are at least sectionally or portionally vertically transported with the circulating conveyor system, wherein each receiving finger or receiving pin is configured in order to at least partially or sectionally receive an upside-down oriented drinking container.

6. The dishwasher according to claim 1, wherein the support system comprises at least one guide extending at least sectionally parallel to the conveyor system and/or at least one guide running at least sectionally parallel to the conveyor system.

7. The dishwasher according to claim 6, wherein the at least one guide runs below the retaining elements and serves to vertically support drinking containers received or retained by the retaining elements, wherein the at least one guide comprises at least one guide rail extending at least sectionally parallel to the conveyor system or at least one guide belt extending at least sectionally parallel to the conveyor system.

8. The dishwasher according to claim 6, wherein the at least one guide runs laterally to the retaining elements and serves to laterally guide drinking containers received or retained by the retaining elements.

9. The dishwasher according to claim 1, wherein the retaining elements are configured such that drinking containers to be cleaned are receivable upside-down, wherein, in a state having been received by the retaining elements, drinking containers are pivotally mounted about an axis extending parallel to the conveyor system relative to the conveyor system and/or relative to the retaining elements.

10. The dishwasher according to claim 9, wherein the at least one guide rail or the at least one guide belt is configured such that, when transporting drinking containers received by the retaining elements in a predefined or pre-definable section or portion of the dishwasher, drinking containers received by the retaining elements are pivoted about the axis running parallel to the conveyor system.

11. The dishwasher according to claim 10, wherein the at least one guide comprises a first guide rail or a first guide belt and at least one second guide rail or at least one second guide belt, wherein the first guide rail or the first guide belt and the at least one second guide rail or the at least one second guide belt run at least sectionally parallel and on a common horizontal plane extending parallel to the conveyor system, wherein, in the predefined or pre-definable section or portion of the dishwasher, the at least one second guide rail or the at least one second guide belt runs parallel to the first guide rail or to the first guide belt, however on a horizontal plane extending parallel to the conveyor system, horizontal plane is different from the common horizontal plane.

12. The dishwasher according to claim 1, wherein the circulating conveyor system is configured in order to transport the retaining elements connected to the conveyor system with any drinking containers received or retained by the retaining elements to the dishwasher and/or through different sections or portions of the dishwasher, wherein, for this purpose, the conveyor system is operatively connected or operatively connectable to a corresponding drive wherein the conveyor system, when viewed from above, is meander-shaped or stadium-shaped.

13. The dishwasher according to claim 12, wherein the drive of the conveyor system is associated with a control device, which is configured in order to actuate the drive, as needed, wherein the control device is configured in order to:

(a) automatically actuate the drive such that the retaining elements are continuously transported with the conveyor system at a constant transport speed or at a varying transport speed through the sections or portions of the dishwasher; or (b) automatically actuate the drive such that the retaining elements are transported with the conveyor system discontinuously and in a stepwise manner through the sections or portions of the dishwasher, wherein the discontinuous transport is selected such that, in a sensor-controlled manner, the conveyor system always transports the retaining elements further by a predefined or definable distance when at least one drinking container is received in the loading section of the dishwasher by the at least one retaining element.

14. The dishwasher according to claim 12, wherein the dishwasher includes:

a loading section, in which drinking containers are releasably connectable to at least one retaining element of the conveyor;

an unloading section, in which drinking containers can be discharged or unstacked from the dishwasher after treatment in the treatment section; and a return section in which the retaining elements are transported from the unloading section back to the loading section of the dishwasher with the aid of the conveyor.

15. The dishwasher according to claim 1, wherein the dishwasher is associated with an input or insertion section configured as a return device, wherein the conveyor is arranged for transporting the dishes from the input or insertion section to a the treatment section of the dishwasher and from there to an output or removal section of the dishwasher.

16. The dishwasher of claim 1, wherein each retaining element is configured with as a pusher dog that radially protrudes from the conveyor system with respect to the conveying direction, wherein each pusher dog comprises a leading side with a pocket-shaped receiving section, in which a drinking container is at least partially or sectionally receivable, and a trailing side with a pocket-shaped receiving section, in which a drinking container is at least partially or sectionally receivable.

\* \* \* \* \*